US009606311B2

(12) United States Patent
Pikulski et al.

(10) Patent No.: US 9,606,311 B2
(45) Date of Patent: Mar. 28, 2017

(54) THERMAL MANAGEMENT FOR HIGH-POWER OPTICAL FIBERS

(71) Applicant: Raytheon Company, Waltham, MA (US)

(72) Inventors: Joseph L. Pikulski, Westlake Village, CA (US); Michael Ushinsky, Irvine, CA (US); Friedrich P. Strohkendl, Santa Monica, CA (US); Carl W. Townsend, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 160 days.

(21) Appl. No.: 14/133,264

(22) Filed: Dec. 18, 2013

(65) Prior Publication Data
US 2015/0331209 A1 Nov. 19, 2015

(51) Int. Cl.
*G02B 6/12* (2006.01)
*G02B 6/42* (2006.01)
(Continued)

(52) U.S. Cl.
CPC ............ *G02B 6/4272* (2013.01); *C25D 5/02* (2013.01); *C25D 7/0607* (2013.01);
(Continued)

(58) Field of Classification Search
CPC .......................... G02B 6/4269; G02B 6/4273
See application file for complete search history.

(56) References Cited

U.S. PATENT DOCUMENTS

| 4,647,147 A | 3/1987 | Pikulski et al. |
| 4,708,431 A | 11/1987 | Pikulski et al. |

(Continued)

FOREIGN PATENT DOCUMENTS

| EP | 0062055 B1 | 9/1986 |
| EP | 0623565 B1 | 9/1986 |

(Continued)

OTHER PUBLICATIONS

"Electroforming" Wikipedia; http://en.wikipedia.org/wiki/Electroforming; modified Dec. 15, 2013; 3 pages.
(Continued)

*Primary Examiner* — Chad Smith

(57) ABSTRACT

A method includes obtaining a substrate having at least one exposed metal surface. The method also includes electro-depositing metal onto the at least one exposed metal surface of the substrate and around at least a portion of an optical fiber to secure the optical fiber to the substrate. The substrate and the electro-deposited metal are configured to remove heat from the optical fiber. The method could further include electro-depositing metal around a sacrificial material and removing the sacrificial material to form at least one cooling channel through the electro-deposited metal. The optical fiber could include a polymer coating, where a portion of the polymer coating is removed at an end of the optical fiber. The substrate and the electro-deposited metal could be faceted at an input of the optical fiber and at an output of the optical fiber. The optical fiber could have a coiled arrangement on the substrate.

28 Claims, 8 Drawing Sheets

(51) Int. Cl.
*C25D 5/02* (2006.01)
*C25D 7/06* (2006.01)
*G02B 6/36* (2006.01)
*H01S 3/067* (2006.01)
*H01S 3/042* (2006.01)
*H01S 3/04* (2006.01)

(52) U.S. Cl.
CPC ............ *G02B 6/3608* (2013.01); *H01S 3/042* (2013.01); *H01S 3/06704* (2013.01); *G02B 6/3612* (2013.01); *G02B 6/3636* (2013.01); *H01S 3/0407* (2013.01)

(56) References Cited

U.S. PATENT DOCUMENTS

| | | | |
|---|---|---|---|
| 4,733,933 A * | 3/1988 | Pikulski | C03C 25/108 250/577 |
| 5,389,193 A | 2/1995 | Coucoulas et al. | |
| 6,174,648 B1 * | 1/2001 | Terao | G02B 6/02138 359/855 |
| 8,493,651 B1 * | 7/2013 | Hu | H01S 3/06754 359/341.1 |
| 2010/0247055 A1 * | 9/2010 | Arashitani | H01S 3/0405 385/137 |
| 2014/0240818 A1 * | 8/2014 | Taya | H01S 3/0405 359/341.1 |
| 2014/0367859 A1 * | 12/2014 | Carpenter | H01L 24/48 257/762 |

FOREIGN PATENT DOCUMENTS

| | | |
|---|---|---|
| EP | 0635737 A1 | 6/1994 |
| EP | 0656025 B2 | 6/1995 |
| EP | 1369719 A1 | 12/2003 |
| JP | 2003161845 A | 6/2003 |
| WO | WO 02/19006 A2 | 3/2002 |
| WO | WO 02/36852 A2 | 5/2002 |
| WO | WO 03/006395 A1 | 1/2003 |
| WO | WO 2012/098835 A1 | 7/2012 |

OTHER PUBLICATIONS

Notification of Transmittal of the International Search Report, in connection with PCT/US2014/060872, filed Oct. 16, 2014, 5 pages.
Written Opinion of the International Searching Authority in connection with PCT/US2014/060872, filed Oct. 16, 2014, 7 pages.

* cited by examiner

THERMAL MANAGEMENT FOR HIGH-POWER OPTICAL FIBERS

TECHNICAL FIELD

This disclosure is generally directed to thermal management techniques. More specifically, this disclosure is directed to thermal management for high-power optical fibers.

BACKGROUND

Various types of devices use optical fibers to generate, amplify, and/or transport high-power signals. For example, high-power pump lasers can be used to excite active ions in a core of an optical fiber and deposit energy, which is then extracted by signal beams. The energy transfer from pump to signal is naturally not perfect, and heat is generated as a consequence. Heat is a major performance limiter through mechanisms such as temperature-dependent refractive indices and mechanical stresses caused by temperature gradients. Both of these characteristics create various issues with laser-based devices.

With respect to temperature-dependent refractive indices, in high-power laser devices, a high beam quality is often of utmost importance. To obtain optimum beam quality, all laser power is ideally carried in a single mode, where the amplitude and phase are well-defined across a beam's cross-section so that the behavior of the beam can be manipulated with simple optical elements like lenses. Unfortunately, conventional devices used in the generation of high-power beams often allow more than one mode to exist. For example, Large Mode Area (LMA) fibers can guide more than one mode. Designers of high-power laser systems often take great care to avoid mode coupling, which occurs when a single-mode beam breaks up into several modes. A temperature-dependent refractive index is a major factor in creating mode coupling.

With respect to mechanical stresses, these stresses over the long-term can lead to mechanical failures. Before a mechanical failure occurs, however, mechanical stresses also cause lensing and stress-induced birefringence, which are additional mechanisms for causing mode coupling and therefore beam breakup.

As a result, the management of heat is often an important challenge for high-power laser devices. One conventional thermal management technique involves depositing a thin layer of metal over an optical fiber. The thickness of the metal layer could vary depending on the diameter of the optical fiber. For example, the thickness of the metal layer could vary between 5-60 microns. The metal layer is typically soldered onto another structure, such as a passive device having a large thermal mass. The metal layer transports heat away from the optical fiber to the large thermal mass.

Unfortunately, this approach can have various drawbacks. For example, the metal layer typically includes voids that limit heat transfer away from an optical fiber. Also, thicker metal layers may suffer from increased spalling stresses, which can result in device failures. Further, there are often fiber length limitations due to different coefficients of thermal expansion of the metal layer and a glass cladding of an optical fiber, and soldering at high temperatures can create thermal stresses in optical fibers. In general, this technique suffers from a number of limitations and secondary effects that can degrade device performance.

SUMMARY

This disclosure provides thermal management for high-power optical fibers.

In a first embodiment, a method includes obtaining a substrate having at least one exposed metal surface. The method also includes electro-depositing metal onto the at least one exposed metal surface of the substrate and around at least a portion of an optical fiber to secure the optical fiber to the substrate. The substrate and the electro-deposited metal are configured to remove heat from the optical fiber.

In a second embodiment, an apparatus includes a substrate, an optical fiber, and electro-deposited metal thermally coupled to the substrate and around at least a portion of the optical fiber. The substrate and the electro-deposited metal are configured to remove heat from the optical fiber.

In a third embodiment, a system includes a laser configured to generate optical signals and an apparatus configured to transport the optical signals. The apparatus includes a substrate, an optical fiber configured to transport the optical signals, and electro-deposited metal thermally coupled to the substrate and around at least a portion of the optical fiber. The substrate and the electro-deposited metal are configured to remove heat from the optical fiber.

In a fourth embodiment, a method includes obtaining a substrate having at least one exposed metal surface. The method also includes depositing metal onto the at least one exposed metal surface of the substrate and around at least a portion of an optical fiber to secure the optical fiber to the substrate. The substrate and the deposited metal are configured to remove heat from the optical fiber. In particular embodiments, the metal is deposited using an electro-deposition technique, a metal vapor deposition technique, a sputtering technique, or a chemical vapor deposition technique.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1A through 14, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
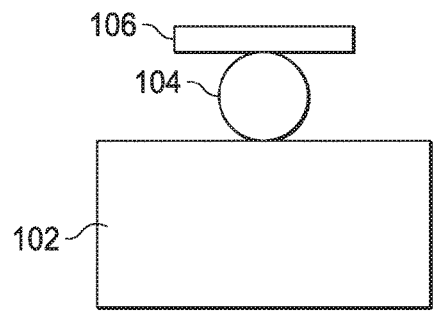
FIGS. 1A through 1G illustrate an example technique for providing thermal management for an optical fiber in accordance with this disclosure.
Figure 1B:
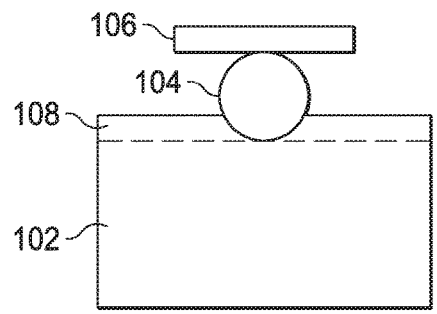
Figure 1C:
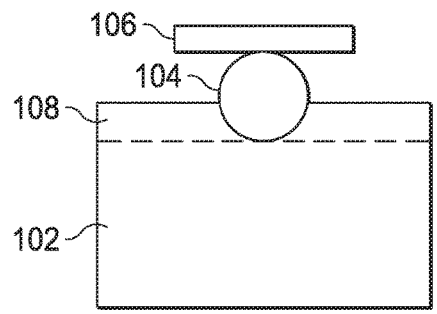

FIGS. 1A through 1G illustrate an example technique for providing thermal management for an optical fiber in accordance with this disclosure. As shown in FIG. 1A, a substrate 102 is provided, and an optical fiber 104 is placed on or over the substrate 102. The substrate 102 can conduct heat away from the optical fiber 104 when the optical fiber 104 is being used, such as in a high-power laser system. The substrate 102 can be formed from at least one metal onto which additional metal can be deposited in order to partially or fully encase the optical fiber 104. The substrate 102 can include any suitable metal(s), such as a copper substrate or a beryllium or molybdenum substrate coated with copper. The substrate 102 could also have any suitable size, shape, and dimensions, such as a thickness of about ⅛ inch (about 3.175 mm).

Any suitable type of optical fiber 104 could be used. For example, an optical fiber 104 with one or multiple cores could be used. Also, the optical fiber 104 could represent a single optical fiber or multiple optical fibers that are connected together, such as by using a splice. Specific types of optical fibers 104 that could be used can include fused silica and phosphate-doped or other doped fibers.

The optical fiber 104 can initially be held in place on or over the substrate 102 by a support structure 106. The support structure 106 represents any suitable structure that can hold the optical fiber 104 on or near the substrate 102 so that subsequent deposition of metal connects the optical fiber 104 to the substrate 102. For example, the support structure 106 could include a transparent pad formed from a flexible inert silicone elastomer, a plumber, or platers tape.

As shown in FIGS. 1B through 1E, additional metal 108 is deposited onto the substrate 102 around a portion of the optical fiber 104. The additional metal 108 could represent any suitable metal(s), such as copper. Also, any suitable deposition technique can be used to deposit additional metal 108 onto the substrate 102, such as an electro-deposition technique, a metal vapor deposition technique, a sputtering technique, or a chemical vapor deposition technique. As a particular example, the substrate 102 and the optical fiber 104 can be submerged in a solution containing copper sulfate and sulfuric acid during an electro-deposition technique.

Figure 1D:
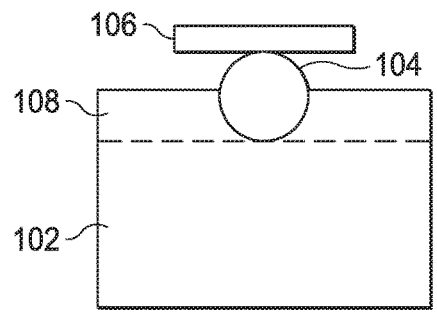
Figure 1E:
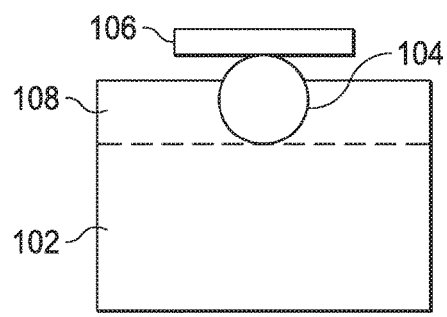
Figure 1F:
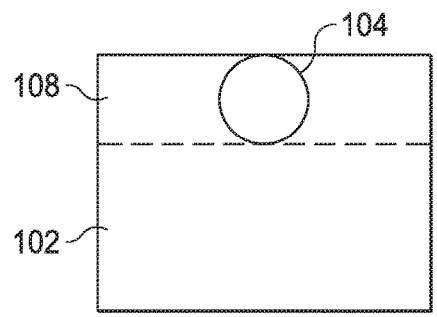
Figure 1G:
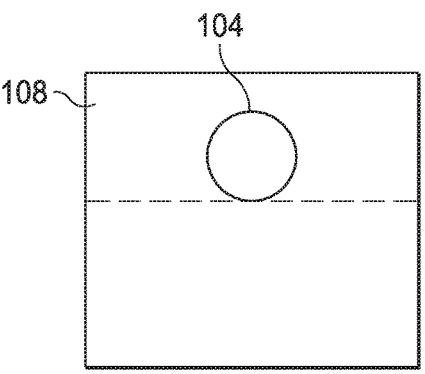

The additional metal 108 could be deposited to any suitable height over the substrate 102 or over the optical fiber 104. For example, in some embodiments, the additional metal 108 can be deposited until it partially encases the optical fiber 104, such as is shown in FIG. 1D or 1E. Any suitable partial amount of encasement could be obtained, such as when at least about 50% of the optical fiber 104 is covered in metal. In other embodiments, the additional metal 108 can be deposited until it fully encases the optical fiber 104, such as is shown in FIGS. 1F and 1G. In these embodiments, the support structure 106 can be removed from the optical fiber 104 once a desired level of partial encasement is obtained and the optical fiber 104 is suitably secured to the substrate 102. Deposition of the additional metal 108 can then resume and continue until the additional metal 108 has a desired height above the substrate 102 or the optical fiber 104.

In this way, the substrate 102 and the additional metal 108 form a structure that at least partially encases the optical fiber 104. This structure is very effective at transporting heat away from the optical fiber 104 while avoiding one, some, or all of the problems associated with conventional approaches. One or more passive or active cooling devices can be coupled to this structure in order to transport heat out of the substrate 102 and the additional metal 108. Once the optical fiber 104 is partially or fully encased in this manner, any additional processing operations could occur. For example, the ends of the optical fiber 104 could be polished, and additional structures could be formed to couple the optical fiber 104 to other components of a device or system.

Figure 2A:
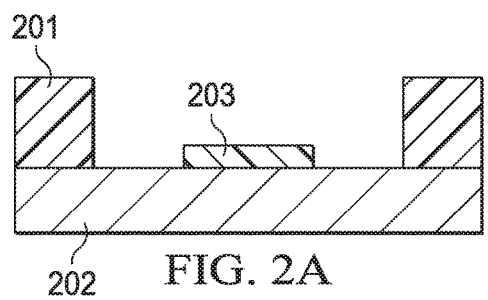
FIGS. 2A through 2F illustrate another example technique for providing thermal management for an optical fiber in accordance with this disclosure.

FIGS. 2A through 2F illustrate another example technique for providing thermal management for an optical fiber in accordance with this disclosure. As shown in FIG. 2A, a masking material 201 and a sacrificial material 203 are formed or otherwise placed on a substrate 202. The sacrificial material 203 is located within a space defined by the masking material 201, and the masking material 201 is used to define the space in which additional metal is deposited onto the substrate 202. However, the use of the masking material 201 is optional. The sacrificial material 203 represents a material that can be encased in deposited metal and later removed. Any suitable sacrificial material 203 could be used, such as a wax preform or a gallium preform (such as one with a melting point of about 30° C.). The sacrificial material 203 could also have any suitable size, shape, and dimensions.

Figure 2B:
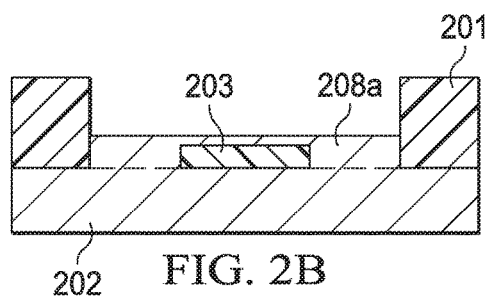

As shown in FIG. 2B, additional metal 208a is deposited between the masking material 201 and over the sacrificial material 203. Any suitable amount of additional metal 208a can be deposited over the sacrificial material 203. The additional metal 208a could represent any suitable metal(s), such as copper. The additional metal 208a could also be deposited in any suitable manner, such as by using an electro-deposition technique, a metal vapor deposition technique, a sputtering technique, or a chemical vapor deposition technique.

Figure 2C:
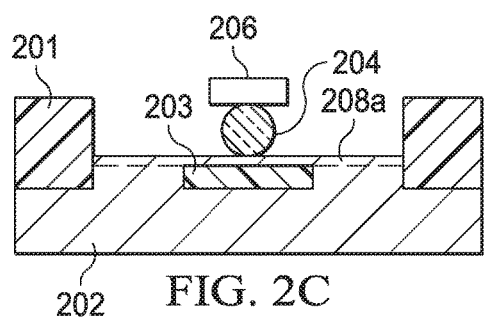
Figure 2D:
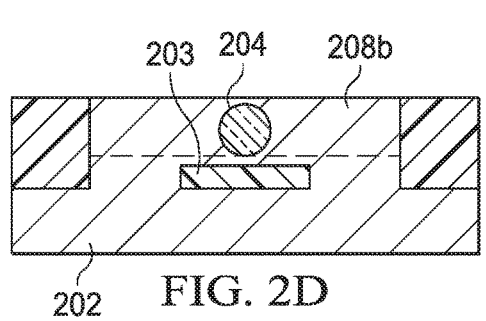

As shown in FIG. 2C, an optical fiber 204 is placed on or over the structure and held in place using a support structure 206. These components could be the same as or similar to the corresponding components 104-106 in FIGS. 1A through 1G. The deposition then continues in order to deposit additional metal 208b around the optical fiber 204 as shown in FIG. 2D. While the additional metal 208b completely covers the optical fiber 204 here, the additional metal 208b could only partially cover the optical fiber 204. The additional metal 208b could be deposited in any suitable manner, such as by using an electro-deposition technique, a metal vapor deposition technique, a sputtering technique, or a chemical vapor deposition technique.

The original substrate 202 and the additional metal 208a-208b form a structure around the optical fiber 204, which again is very effective at transporting heat away from the optical fiber 204 while avoiding one, some, or all of the problems associated with conventional approaches. One or more passive or active cooling devices can be coupled to this structure in order to transport heat out of the substrate 202 and the additional metal 208a-208b.

Figure 2E:
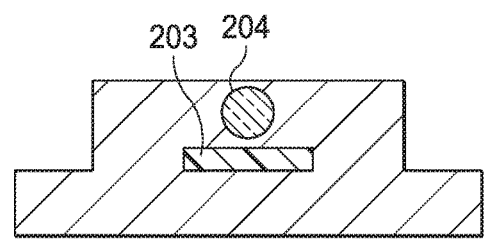
Figure 2F:
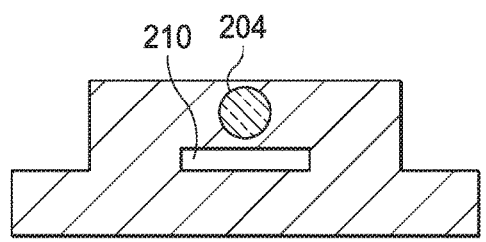

Once the optical fiber 204 is partially or fully encased in this manner, any additional processing operations could occur. For example, the ends of the optical fiber 204 could be polished, and additional structures could be formed to couple the optical fiber 204 to other components of a device or system. Also, at some point during this process, the masking material 201 can be removed as shown in FIG. 2E, and the sacrificial material 203 can be removed to leave a cooling channel 210 as shown in FIG. 2F. The cooling channel 210 represents an area of the structure through which a cooling fluid can pass in order to remove heat from the structure. The cooling channel 210 could have any suitable size, shape, and dimensions defined at least in part by the sacrificial material 203 and the technique used to remove the sacrificial material 203 from within the surrounding metal.

The approaches shown in FIGS. 1A through 2F can provide various benefits depending on the implementation. For example, partially or fully encapsulating an optical fiber 104, 204 in metal provides an improved mechanism for thermally managing the optical fiber. Also, the encapsulation and end face geometry associated with the optical fiber 104, 204 can be controlled to support both free space and fiber-coupled systems. Further, optical fibers having very long lengths can be encapsulated in this manner, easing the length limitations typically imposed in conventional systems. Moreover, metal deposited in a low-stress manner (such as via electro-deposition, metal vapor deposition, sputtering, or chemical vapor deposition) can have significantly fewer voids than metal layers conventionally used with optical fibers, which increases the heat transfer capacity of the deposited metal. Not only that, various approaches (such as electro-deposition) can be used to deposit metal at much lower temperatures (such as at room temperatures) compared to soldering, which induces much less stress in the optical fiber. In addition, the deposited metal can be used to form hermetic seals around multiple optical fibers that are coupled together. Additional benefits, such as those described below, are also possible.

Although FIGS. 1A through 2F illustrate examples of techniques for providing thermal management for an optical fiber, various changes may be made to FIGS. 1A through 2F. For example, the relative sizes, shapes, and dimensions of the components in these figures are for illustration only. Also, various features shown in FIGS. 1A through 1G could be used in FIGS. 2A through 2F and vice versa. For instance, the masking material 201 or sacrificial material 203 could be used in FIGS. 1A through 1G. Further, while the optical fibers 104, 204 are shown as being placed onto a flat substrate 102, 202 or underlying metal 208a, the substrate or underlying metal need not be flat. For instance, a substrate 102, 202 or underlying metal 208a could be grooved, and an optical fiber 104, 204 could be placed within the groove. This facilitates easier placement and retention of the optical fiber and surrounds part of the optical fiber with metal (which can shorten the metal deposition period). Beyond that, the orders of the operations shown in FIGS. 1A through 2F could change depending on the implementation. In addition, while copper has been described above as being used in the substrate 102, 202 and as the deposited metal, various other metals (including metal alloys) could also be used, such as any highly-conductive metal or any alloy containing a highly-conductive metal like nickel silver. Finally, while a single recess 203 below an optical fiber 204 is shown here, a structure could include any number of recesses 203 in any suitable location(s).

Figure 3:
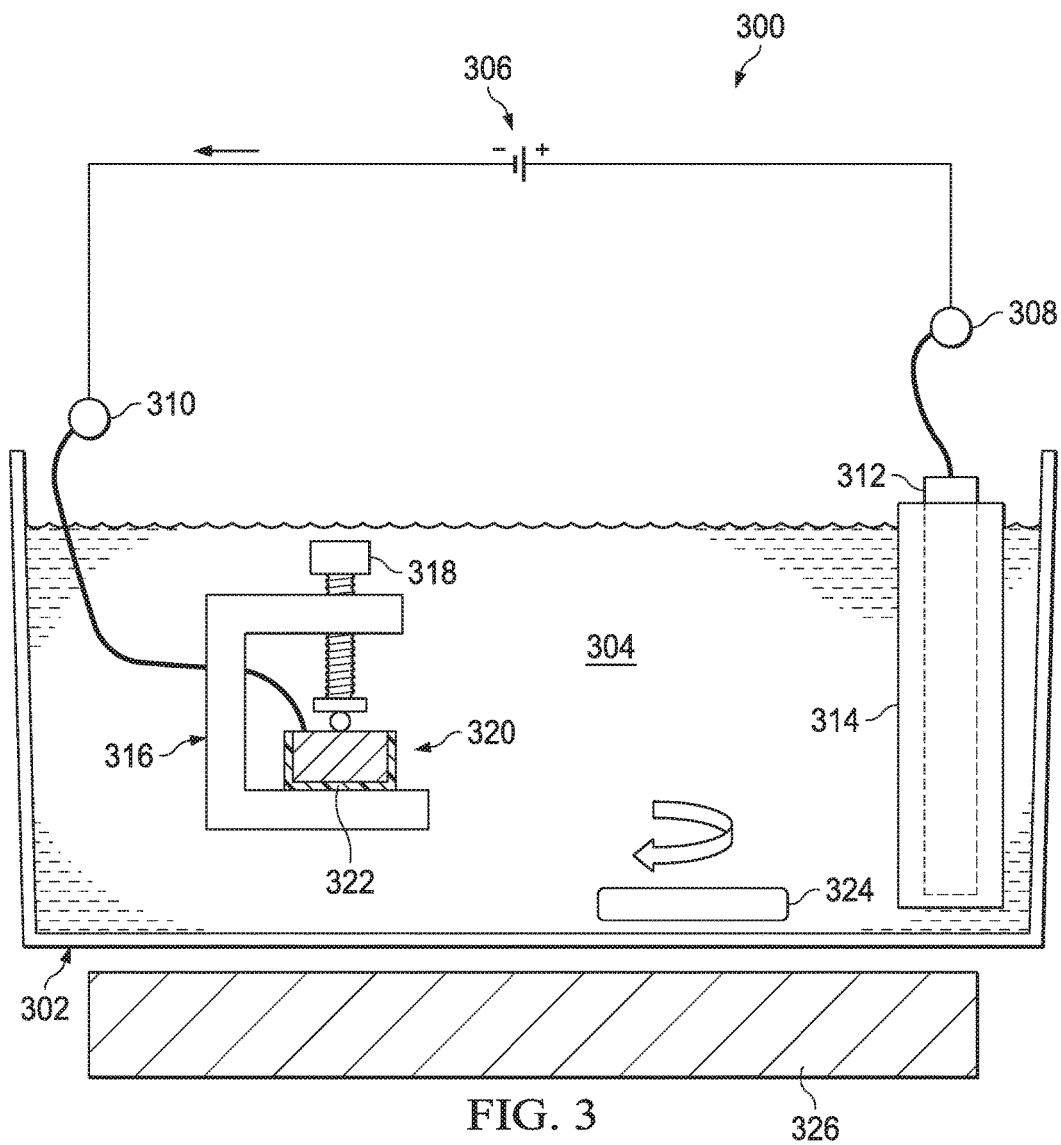
FIG. 3 illustrates an example system for use in fabricating a thermal management solution for an optical fiber in accordance with this disclosure.

FIG. 3 illustrates an example system 300 for use in fabricating a thermal management solution for an optical fiber in accordance with this disclosure. As shown in FIG. 3, the system 300 includes a container 302 holding an electro-forming solution 304. The container 302 represents any suitable structure configured to hold or retain an electro-forming solution. The electro-forming solution 304 represents any suitable solution that can be used to electro-deposit metal, such as copper, onto another structure. As a particular example, the electro-forming solution 304 could include copper sulfate in a solution that contains about 10% to about 12% by weight of sulfuric acid.

The system 300 also includes a voltage or current source 306 electrically coupled to an anode connection 308 and a cathode connection 310. The voltage or current source 306 represents any suitable structure configured to generate an electrical current through the electro-forming solution 304. The connections 308-310 represent any suitable structures to which other components of the system 300 can be electrically coupled.

A metal anode 312 is coupled to the anode connection 308 and may be contained within an anode bag 314. The metal anode 312 can be formed from one or more metals, such as copper. The anode bag 314 can be used to collect particulate matter around the metal anode 312. The copper or other metal(s) in the electro-forming solution 304 can originate from the metal anode 312.

In this example, a fixture 316 and a thumb screw 318 are used to hold an assembly 320 in place. The assembly 320 here includes the substrate 102, optical fiber 104, and support structure 106 of FIGS. 1A through 1G. The assembly 320 could alternatively include the substrate 202, optical fiber 204, and support structure 206 of FIGS. 2A through 2F or any other suitable structure containing a substrate and an optical fiber to be at least partially encased. The fixture 316 could have any suitable size, shape, and dimensions and be formed from any suitable material(s). The thumb screw 318 can be formed from any suitable material(s), such as nylon. Note, however, that any other suitable mechanism could be used to hold the assembly 320 within an electro-forming solution 304.

The metal substrate of the assembly 320 is electrically coupled to the cathode connection 310, and part of the metal substrate is covered in a masking material 322. When current flows through the electro-forming solution 304, this causes metal to be electro-deposited onto the exposed surface(s) of the metal substrate not covered by the masking material 322. The masking material 322 could be formed from any suitable material(s) and cover any suitable portion(s) of the metal substrate, such as all surfaces except a top of the metal substrate.

The electro-forming solution 304 could be agitated within the container 302 in any suitable manner during an electro-deposition process. For example, a magnetic impeller 324 within the container 302 could be moved using a magnetic actuator 326 outside the container 302. However, any other suitable agitator could be used in the system 300.

During an electro-deposition process, the assembly 320 can be secured to the fixture 316 using the thumb screw 318, and the fixture 316 and the assembly 320 can be lowered into the electro-forming solution 304. A current is created through the electro-forming solution 304 using the voltage or current source 306, which causes metal to be deposited on the exposed metallic surface(s) of the assembly 320.

The electro-deposition can slowly encase the optical fiber 104, 204 in the assembly 320 to a desired level. If partial encasement of the optical fiber is desired, the deposition of metal on the assembly 320 can continue until a desired level of encasement is obtained. At that point, current through the electro-forming solution 304 can stop, and the fixture 316 and the assembly 320 can be removed from the container 302.

If complete encasement of the optical fiber is desired, the deposition of metal on the assembly 320 can continue until the optical fiber is encased by a desired amount, such as at least about 50%. Current through the electro-forming solution 304 can stop, the fixture 316 and the assembly 320 can be removed from the container 302, and the assembly 320 can be removed from the fixture 316. The assembly 320 without the support structure 106, 206 can then be secured to the fixture 316 and placed back into the electro-forming solution 304, or the assembly 320 without the fixture 316 can be placed back into the electro-forming solution 304. The encasement of the optical fiber can be completed by again applying current to the electro-forming solution 304.

The metal(s) used for the electro-deposition process and the thickness and density of the metal(s) can be selected based on various factors. For example, the metal(s), thickness, and density could be selected based on the desired level of thermal conductivity and based on the optical fiber 104, 204 being at least partially encased. Characteristics of the optical fiber that can affect the selections include insulation parameters of the optical fiber, thermal contact or interfacial resistance between the optical fiber and the metal, differences in geometry of a core and glass cladding(s) of the optical fiber, surface preparation and activation of the glass cladding(s) of the optical fiber prior to electro-forming, and the geometry and materials of any fiber splices used with the optical fiber. Differences in geometry of the core and the cladding(s) of the optical fiber can include the diameters of the core and core light modes and the diameter(s) of the cladding(s), which can differ across different types of optical fibers. The specific selections for the electro-deposition process involving a particular device can be determined experimentally, and ideally these conditions can reduce or minimize micro-voiding at the interface of the electro-deposited metal and the optical fiber.

Although FIG. 3 illustrates one example of a system 300 for use in fabricating a thermal management solution for an optical fiber, various changes may be made to FIG. 3. For example, any other suitable system could be used to electro-deposit metal around at least part of an optical fiber. Also, while often described as electro-forming copper, a wide variety of other metals could be used. In addition, as noted above, other deposition techniques could be used to deposit metal onto a substrate in order to partially or fully encase an optical fiber, such as metal vapor deposition, sputtering, or chemical vapor deposition.

Figure 4A:
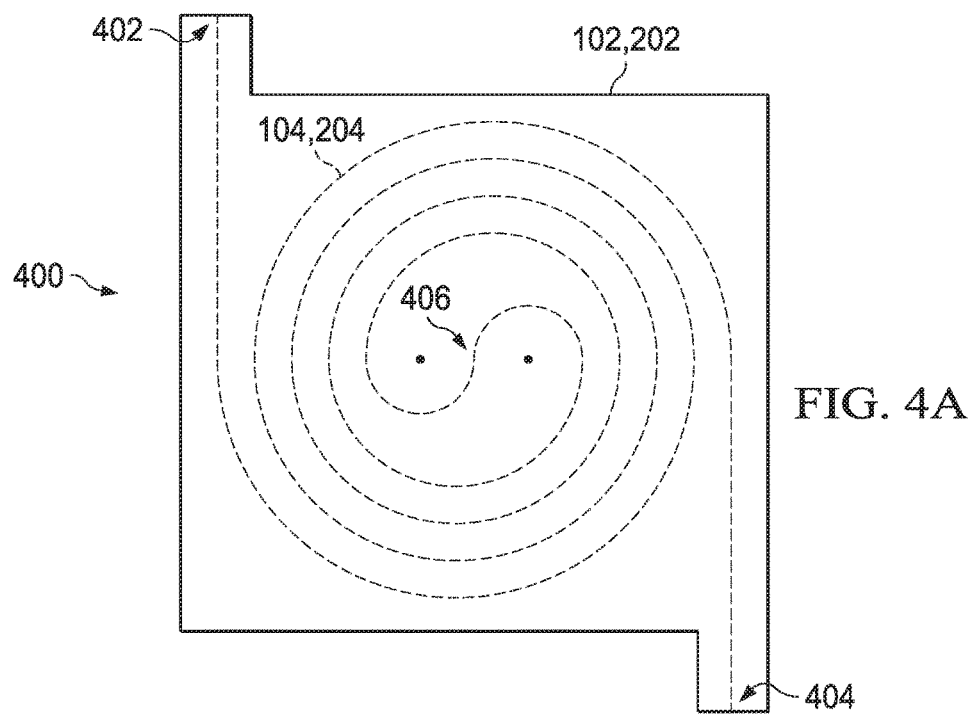
FIGS. 4A and 4B illustrate example optical fiber layouts in accordance with this disclosure.
Figure 4B:
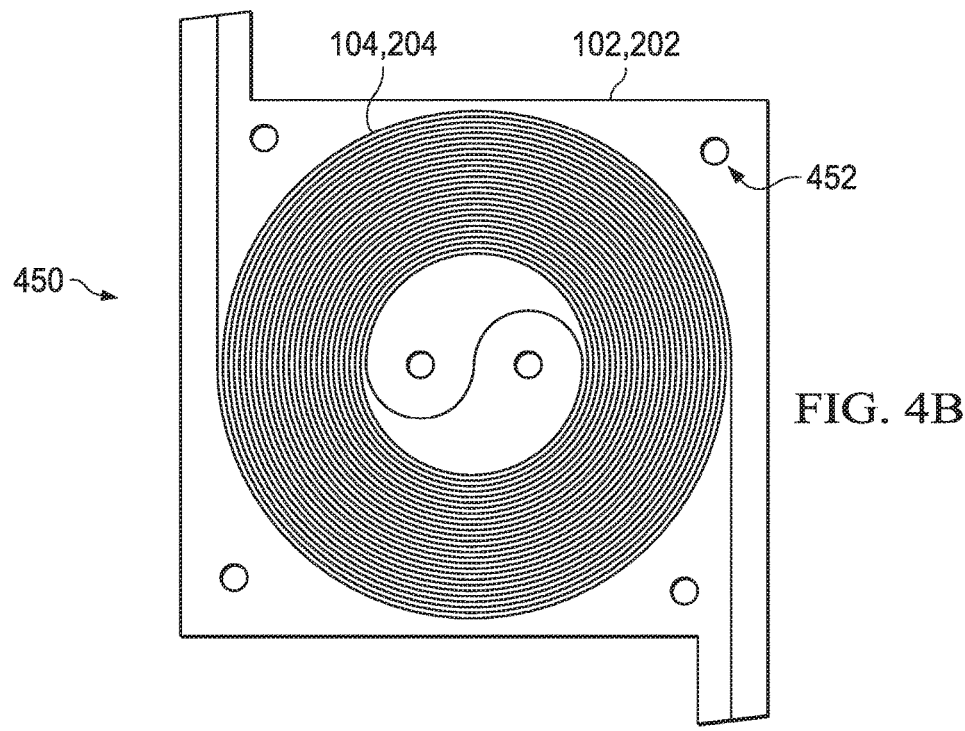

FIGS. 4A and 4B illustrate example optical fiber layouts 400, 450 in accordance with this disclosure. The optical fiber layouts 400, 450 represent possible arrangements of an optical fiber onto a substrate or underlying metal, where the optical fiber is then partially or fully encased in metal using a metal deposition process.

As shown in FIG. 4A, the layout 400 includes the optical fiber 104, 204 placed in a coiled fashion on the substrate 102, 202. One end 402 of the optical fiber 104, 204 represents an input, and another end 404 of the optical fiber 104, 204 represents an output. The substrate 102, 202 at the ends 402-404 of the optical fiber 104, 204 could be angled, such as at about 5°. However, any suitable end face geometry or geometries could be supported. Also, the end face geometry or geometries could be formed in any suitable manner, such as by polishing.

Moving from the input end 402 to the output end 404, the optical fiber 104, 204 follows an in-plane coiled path in one direction (counter-clockwise in this example) before reversing the direction of travel around a middle portion 406 of the substrate 102, 202. The optical fiber 104, 204 then follows an in-plane coiled path in another direction (clockwise in this example) before reaching the output end 404.

The layout 450 in FIG. 4B has a similar arrangement. However, the optical fiber 104, 204 in FIG. 4B is longer and includes a larger number of coils, and the coils are placed closer together. The maximum number of coils for an optical fiber on a given substrate could be based on the minimum bend radius recommended by the optical fiber's manufacturer. Keeping the bend radii of the optical fiber 104, 204 larger than the minimum bend radius can help to reduce or minimize micro-bend losses.

In FIG. 4B, the substrate 102, 202 includes multiple mounting holes 452. These holes 452 represent areas where bolts or other connecting mechanisms can be used to mount the substrate 102, 202 in a desired position. Each hole 452 could have any suitable size, shape, and dimensions. Each hole 452 could also be formed in any suitable manner, such as by drilling. In addition, any number of mounting holes 452 could be provided in a substrate at any suitable location(s). Note, however, that the use of mounting holes 452 is optional and that other mechanisms could be used to secure a substrate in a desired location.

In both FIGS. 4A and 4B, the underlying substrate 102, 202 (or the underlying metal 208a) could be etched to form one or more recesses defining the coiled path of the optical fiber 104, 204. The optical fiber 104, 204 could then be placed within the recess(es) prior to the metal deposition process. In some embodiments, small portions of the optical fiber 104, 204 could be secured to the underlying substrate or metal by tape or other connector, and metal deposition could occur to secure the optical fiber to the underlying substrate or metal. The tape or other connector could then be removed so that previously-covered portions of the optical fiber can be covered in metal and the metal deposition process can be completed.

Coiling the optical fibers 104, 204 in this manner can have several benefits. For example, coiling an optical fiber 104, 204 can allow a significant length of fiber to be placed on a substrate 102, 202. This helps to reduce the size of the underlying substrate 102, 202, which can significantly reduce the overall size and weight of the device or system that uses the optical fiber. However, optical fibers having longer lengths are not the only optical fibers that can be used here. Other types of fibers that can benefit from encapsulation in metal can include short high-absorption optical fibers used with signals having higher pulse energies and shorter pulses. Also, optical fibers with polymer coatings can be directly embedded within the deposited metal.

Although FIGS. 4A and 4B illustrate examples of optical fiber layouts 400, 450, various changes may be made to FIGS. 4A and 4B. For example, an optical fiber being at least partially encased in metal could have any other suitable coiled or non-coiled layout. Examples can include bare fibers, slab waveguides, and regular or irregular coiled geometries.

FIGS. 5 through 13 illustrate example features that could be implemented with an optical fiber in accordance with this disclosure. Any of these features or any combination of these features could be used, for example, with the devices shown in FIGS. 1A through 2F.

Figure 5:
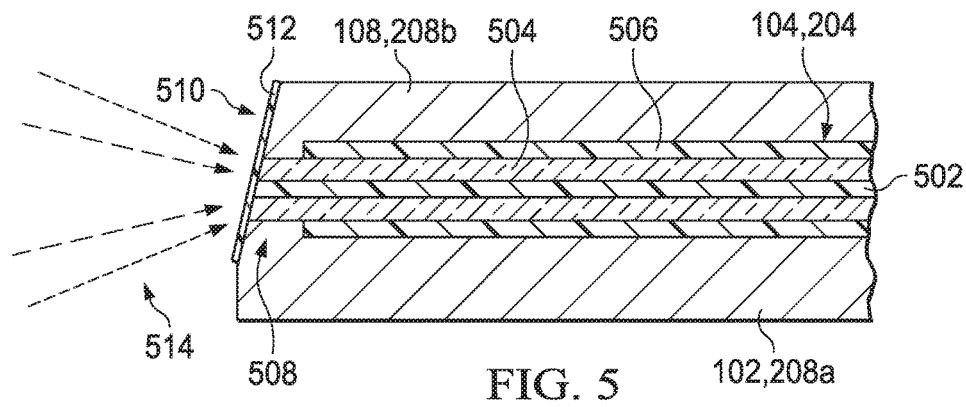
FIGS. 5 through 13 illustrate example features that could be implemented with an optical fiber in accordance with this disclosure.

As shown in FIG. 5, one example embodiment of the optical fiber 104, 204 includes a core 502, a glass cladding 504, and a polymer cladding 506. The polymer cladding 506 can act as an elastic interface to accommodate CTE mismatches between the optical fiber and the surrounding metal. Also, problems associated with use of the polymer cladding 506 are greatly reduced since the polymer cladding 506 can be completely embedded within the surrounding metal.

Also as shown in FIG. 5, a portion 508 of the polymer cladding 506 has been removed in the area near an end facet 510 of the structure. Any suitable portion 508 of the polymer cladding 506 could be removed, such as up to about 40 μm of the polymer cladding or more. The removal of this portion 508 of the polymer cladding 506 can help to avoid burning or melting of the polymer cladding 506 at the location where signals 514 are entering the optical fiber 104, 204. As can be seen here, the polymer cladding 506 is fully encapsulated by the surrounding metal, so the metal can form a hermetic seal around the area where the portion 508 of the polymer cladding 506 has been removed.

The end facet 510 of the structure is covered in an optical film 512. The optical film 512 can facilitate coupling of the signals 514 into the optical fiber 104, 204. The optical film 512 includes any suitable film(s), such as an anti-reflective coating.

The optical film 512 also extends beyond an aperture in which the optical fiber 104, 204 is located (or the exposed portion of the optical fiber) and onto the surrounding metal. This can be beneficial since it is often easier to coat both glass and metal regions together with an optical film. Moreover, having a large composite facet of glass and metal simplifies subsequent cleaning procedures as the fiber body is fully supported mechanically, which is in contrast to geometries that use cantilevered fiber tips.

The end facet 510 can be faceted at any suitable angle and in any suitable manner, such as by polishing and cleaning the structure. The lack of the polymer cladding 506 near the faceted end facet 510 helps to increase the ease of polishing and cleaning the end facet 510. Moreover, recessing the polymer material from the end facet 510 can be useful during high-power operations since outgassing, melting, or burning of the polymer could contaminate the high-power region of the facet and lead to facet failure. Recessing the polymer helps to greatly improve the reliability of the facet.

The signals 514 could be provided by any suitable source, such as a pump laser. The signals 514 are represented here by both solid lines and dashed lines. The solid lines can represent the portion of the signals 514 that enters the cladding 504 of the optical fiber 104, 204, while the dashed lines can represent spill-over of the signals 514 outside the cladding 504. This spill-over can be easily accommodated as it hits the metal portion of the mount, which is directly connected to a heat sink. It may therefore result in little or no heating of the optical fiber 104, 204 and no burning of the polymer cladding 506.

The use of deposited metal around the optical fiber 104, 204 helps to greatly simplify end face preparation. The deposited metal can provide effective heat sinking capabilities right up to the end facet 510. Moreover, the deposited metal provides a solid mechanical mount, which can simplify polishing of the structure to form the end facet 510. Further, a flush interface can exist between the optical fiber 104, 204 and the surrounding metal after polishing, which can simplify cleaning of the structure. The use of an end facet 510 can also be beneficial. For instance, sharp edges can be created at the end facet 510, which helps to reduce or avoid undesirable effects from unintended bevels that can scatter light. This could find particular application with pigtailed pump diodes, pigtail arrays, or other similar types of systems.

Also, the end facet 510 can be sufficiently angled so that reflected signal light is able to penetrate into the polymer cladding 506. The facet angle and the refractive index of the cladding 506 are coordinated to support this function. If the facet angle is too small, the reflected light can be totally internally reflected by the interface of the glass cladding 504 and the polymer cladding 506. Calculation of the threshold facet angle for the onset of polymer penetration is straightforward for given refractive index values of glass and polymer claddings. Active fibers usually have a specified optical numeric aperture (NA) for the glass cladding. The mentioned threshold facet angle is then given by a $\sin(NA)/n$, where n is the refractive index of the glass cladding 504.

The end facet 510 also helps to avoid the creation of parasitic modes, which are undesirable modes of lasing. For example, an amplifier is not supposed to lase at all, but lasing loops can occur if the gain of an optical fiber is high enough, which robs energy from the gain medium. Lasing loops are suppressed through the use of angled end facets. In order to obtain maximum suppression, the facet angles are made large enough so that penetration into the polymer cladding 506 occurs. Relevant properties of the polymer cladding 506 for this purpose are its refractive index, absorption, and diffusive scattering of fluorescent light emitted from the active gain medium. In a fully optimized system, these three properties along with the thickness of the polymer and its elastic properties are design parameters.

Figure 6:
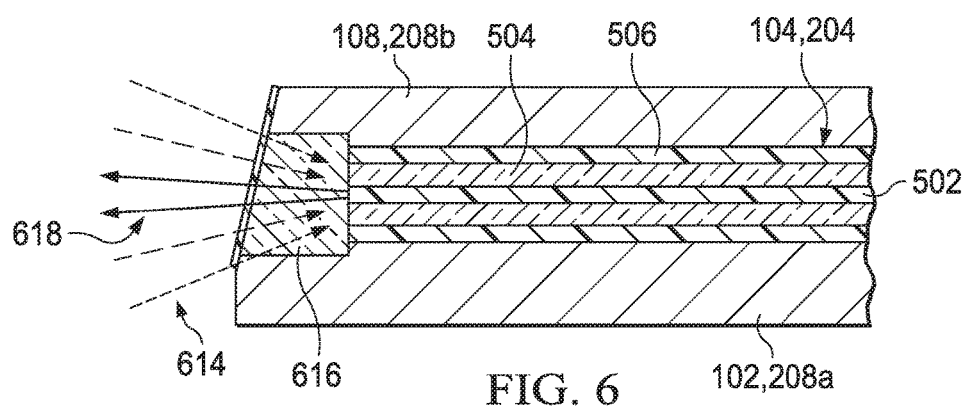

As shown in FIG. 6, the optical fiber 104, 204 has the same structure as the optical fiber in FIG. 5. In this example, however, an end cap 616 is formed adjacent to an end of the optical fiber 104, 204. The end cap 616 represents an area of material, such as un-doped glass, where the optical fiber 104, 204 terminates. The end cap 616 could have any suitable size, shape, and dimensions, such as a length of at least about 1 mm.

The end cap 616 can form a hermetic seal against the optical fiber 104, 204. Also, a stressed transition region from the end cap 616 to the optical fiber 104, 204 can be protected since it is fully encapsulated by the surrounding metal and can be fully heat sunk using the surrounding metal. In this example, signals 614 can enter the glass cladding 504 of the optical fiber 104, 204 through the end cap 616, while signals 618 can exit the core 502 of the optical fiber 104, 204 through the end cap 616 and expand. The over-sized end cap 616 can therefore be used to couple a pump laser into the cladding 504 of the optical fiber. Any spill-over of the pump energy and the related heat generation can occur away from the facet in the bulk of the device.

Note that the end cap 616 can often be shape-mismatched to the remainder of the optical fiber 104, 204, and transition regions leading up to the end cap 616 often have irregular shapes. The deposited metal can conform to these varying shapes much more easily than conventional techniques, which simplifies the fabrication process and improves heat sinking capabilities.

Figure 7:
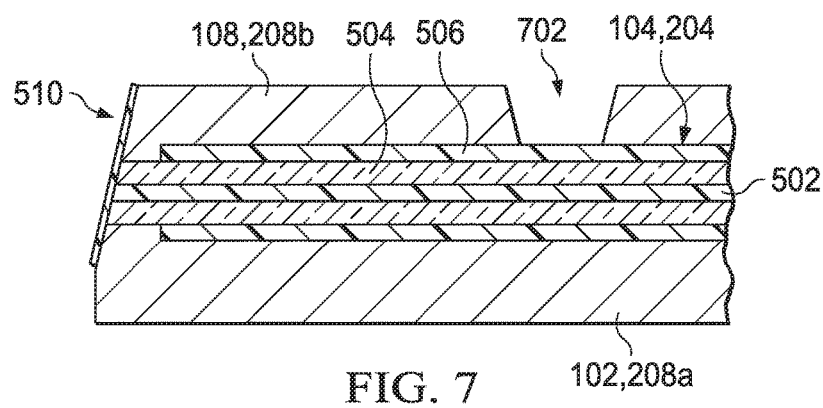

FIG. 7 illustrates a structure similar to that shown in FIG. 5. However, in FIG. 7, the additional metal 108, 208*b* over the optical fiber 104, 204 has been modified to include one or more ports 702. The port(s) 702 could serve one or more purposes depending on the implementation.

In some embodiments, for example, the polymer cladding 506 can incorporate losses at the signal wavelength and can cause scattering or diffusion. Moreover, the end facet 510 of the structure may have a facet angle that is large enough to throw reflected guided amplified spontaneous emissions (ASE) into the glass cladding 504 or the polymer cladding 506. The ports 702 allow for fluorescence produced by signals traveling through the polymer cladding 506 to escape.

In other embodiments, the optical fiber 104, 204 may lack a polymer cladding 506. As a result, the possibility of parasitic modes reflected off the interface between the glass cladding 504 and the surrounding metal exists. By using the ports 702, sections of the optical fiber 104, 204 could remain exposed (without being fully encased in metal) to reduce or minimize the reflectivity for such parasitic modes.

Each of the ports 702 could be formed in any suitable manner, such as by masking a portion of the optical fiber 104, 204 during the metal deposition process. Also, each port 702 could have any suitable size, shape, and dimensions and have any suitable arrangement, such as transverse to or longitudinal with the optical fiber 104, 204.

Figure 8:
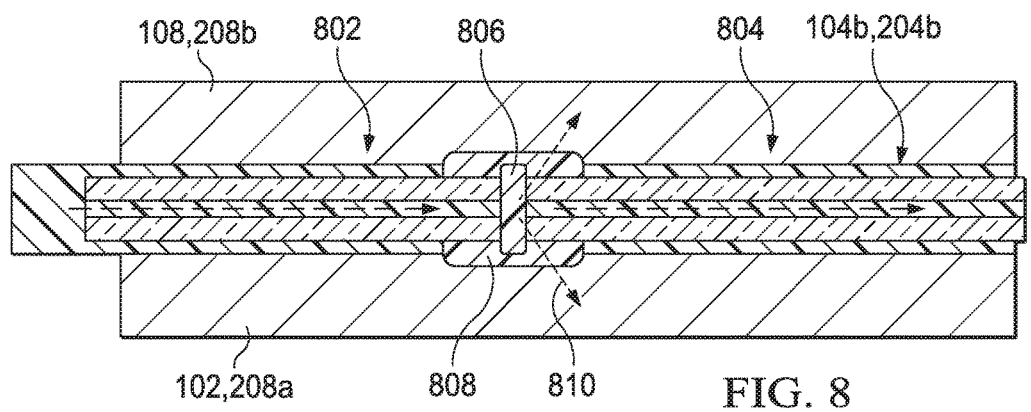

FIG. 8 illustrates an example structure in which the optical fiber 104, 204 is divided into multiple segments 802-804 that are joined at a splice 806. A splice 806 is typically created by locally melting two fiber pieces and then fusing them together. Splices can be created to join pieces of fiber having common or different properties, such as for doped and undoped segments, for segments of different doping levels, for bundles of pump fibers and a signal fiber (known as tapered fiber couplers) coupled to an amplifier fiber, for mode filters, and for mode field adapters. The splice region tends to be more fragile than the bulk fiber and tends to generate scattered light and possibly absorption, which causes heating.

The splice 806 is located within a recoated section 808 of the structure, which denotes an area where metal could be added by a metal deposition technique or other technique after the optical fiber segments 802-804 are joined. As shown here, there is some scattered light 810 that escapes the optical fiber at the splice 806, thereby generating heat that is removed by the surrounding metal. The surrounding metal also acts to terminate the scattered light 810. The conforming nature of the deposited metal protects the splice 806 both structurally and thermally.

Figure 9:
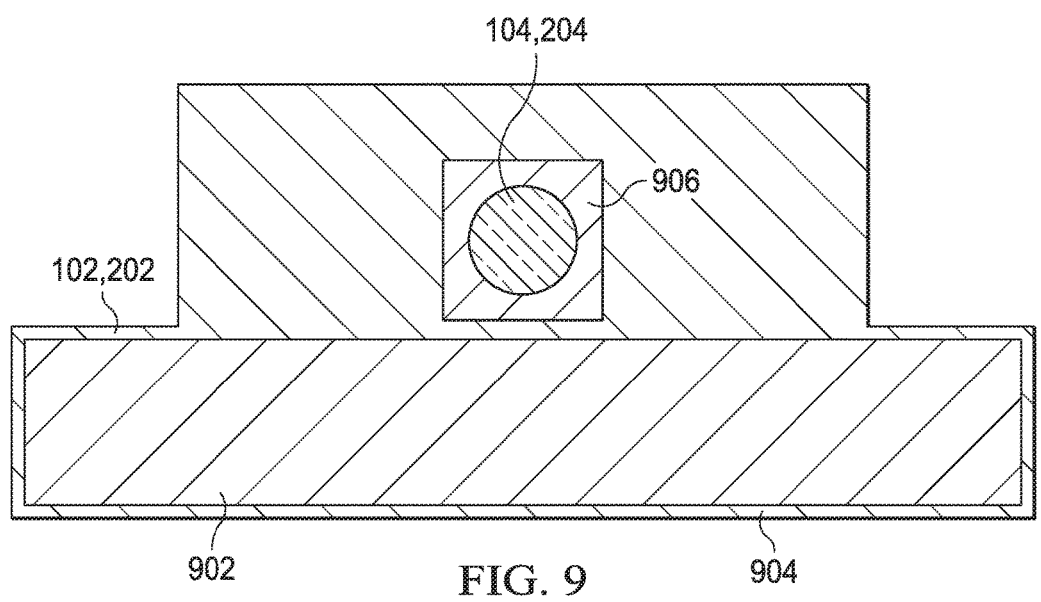

In FIG. 9, the substrate 102, 202 is implemented using a core 902 at least partially surrounded by a metal layer 904. The core 902 could represent any suitable material(s), such as beryllium or molybdenum. The core 902 could have a low CTE and a high thermal conductivity. The metal layer 904 includes any suitable metal(s) on which other metal can be deposited, such as copper. The metal layer 904 could itself be formed in any suitable manner, such as electro-deposition.

Also in FIG. 9, metal is not deposited directly onto the optical fiber 104, 204. Rather, the optical fiber 104, 204 is surrounded by a soft layer of material 906, and metal is deposited around the layer of material 906. The layer of material 906 could include any suitable material(s) having a high thermal conductivity, such as silver, lead, gallium, or indium. As a particular example, lead plating may be used to enhance the malleability of the metal used with softer phosphate glass fibers or fluorophosphates fibers and not cause physical damage based on their differential CTEs.

Figure 10:
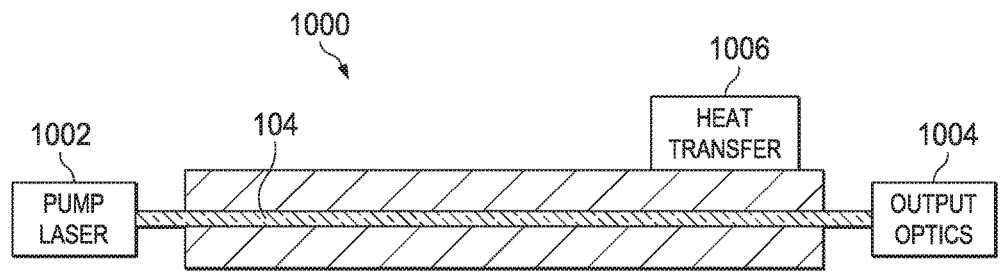
Figure 11:
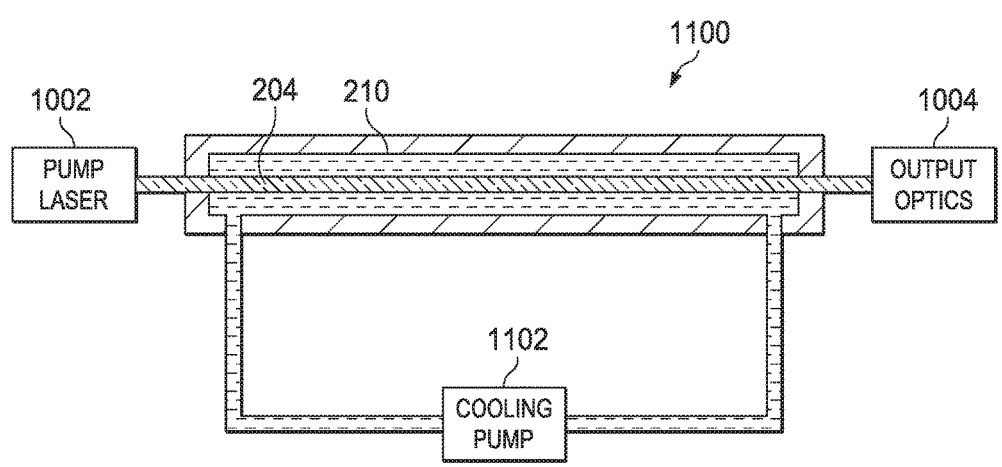
Figure 12:
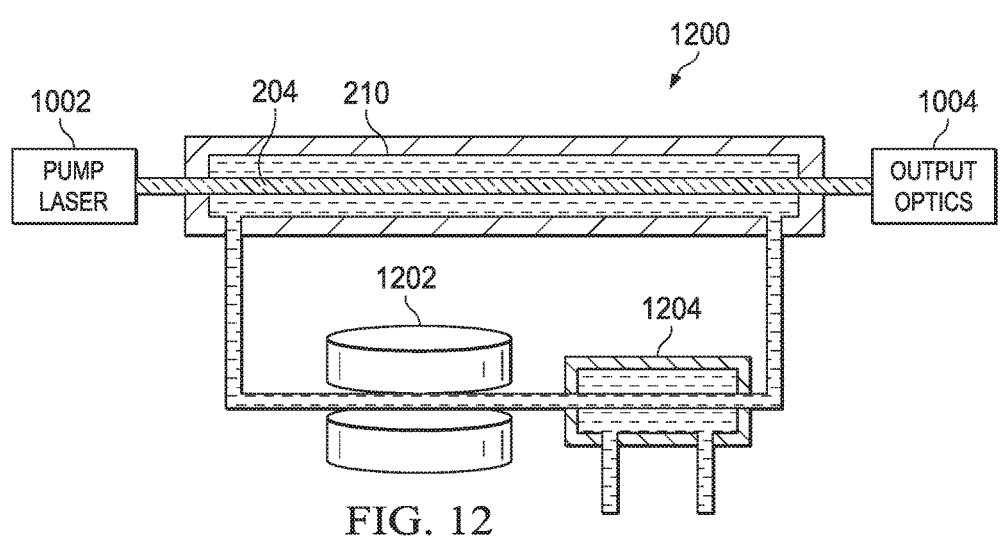

FIGS. 10 through 12 illustrate example systems that could use the structures shown in FIGS. 1A through 2F. In FIG. 10, a pump laser 1002 generates signals that are provided to the optical fiber 104, which is at least partially encased in metal. The signals exit the optical fiber 104 and can be provided to output optics 1004, which could include mirrors, splitters, lenses, or other optical elements that can further alter or direct the signals.

At least one heat transfer unit 1006 can be thermally coupled to the metal surrounding the optical fiber 104 at one or more locations. Each heat transfer unit 1006 can remove heat from the metal surrounding the optical fiber 104 in any suitable manner. For example, a heat transfer unit 1006 could represent a passive or active cooling system designed to dissipate heat, such as one or more heat pipes, metal spreaders, heat sinks, thermoelectric coolers, or blowers.

In FIG. 11, the pump laser 1002 generates signals that are provided to the optical fiber 204 at least partially encased in metal. The signals exit the optical fiber 204 and can be provided to the output optics 1004. In this example, cooling is provided via a cooling loop that includes a pump 1102. The pump 1102 can pump a fluid, such as a liquid or gas, into the cooling channel 210 formed in the metal around the optical fiber 204. The fluid can be used to remove heat from the metal around the optical fiber 204. Any suitable fluid could be used, and the pump 1102 represents any suitable structure that creates a flow of fluid. Note that one or more heat transfer units 1006 could also be used in the system of FIG. 11.

In FIG. 12, multiple cooling loops are used to cool the optical fiber 204. In this example, a first fluid is pumped through the cooling channel 210 in the metal surrounding the optical fiber 204 by a pump 1202. A second cooling loop 1204 is then used to cool the fluid in the first cooling loop. In particular embodiments, the fluid in the first cooling loop could represent a liquid metal, and the pump 1202 represent an electromagnetic pump. However, a multi-loop cooling system could include any suitable fluid(s) and any suitable pump(s). Also note that a multi-loop cooling system could include more than two cooling loops. In addition, note that one or more heat transfer units 1006 could also be used in the system of FIG. 12.

Figure 13:
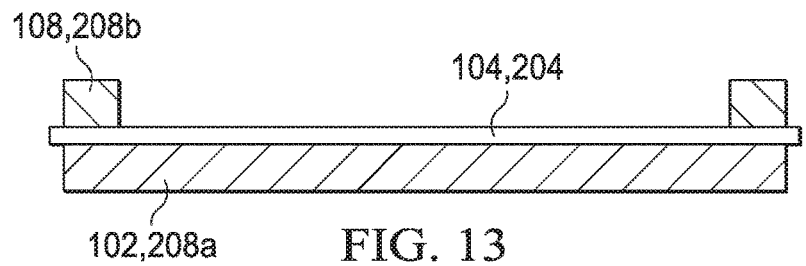

FIG. 13 illustrates that deposition of metal over an entire optical fiber 104, 204 may not be necessary. For example, in FIG. 13, the additional metal 108, 208b could be deposited only at or near the ends of the optical fiber 104, 204, which may represent the areas where heat removal is required most. The additional metal 108, 208b could essentially form connector pieces that may be fastened to heat sinks or other passive or active heat transfer devices. Note, however, that the additional metal 108, 208b could be deposited in other or additional locations along the optical fiber 104, 204. Also note that while not shown here, at least one recess 203 could be formed in the metal surrounding the optical fiber 104, 204. In addition, note that the underlying substrate 102, 202 or underlying metal 208a need not be continuous under the optical fiber 104, 204 and could similarly contact the optical fiber 104, 204 only at specified locations.

Although FIGS. 5 through 13 illustrate examples of features that could be implemented with an optical fiber, various changes may be made to FIGS. 5 through 13. For example, FIGS. 5 through 13 are merely meant to illustrate different features that could be incorporated into a structure where an optical fiber is at least partially encased in deposited metal. None, one, or more than one of these features could be used. Also, additional features not shown here could be used.

Figure 14:
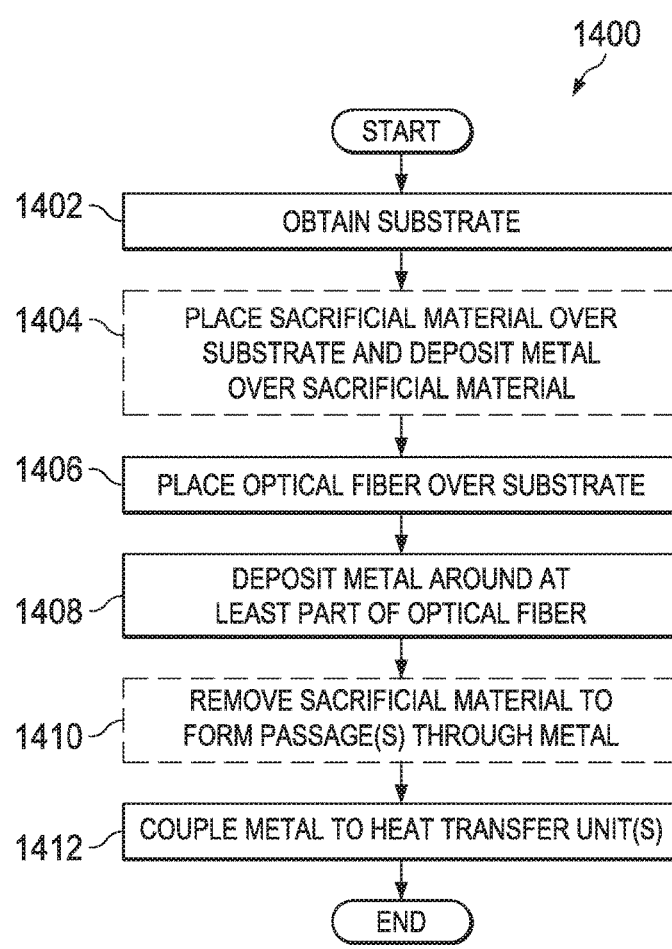
FIG. 14 illustrates an example method for providing thermal management for an optical fiber in accordance with this disclosure.

FIG. 14 illustrates an example method 1400 for providing thermal management for an optical fiber in accordance with this disclosure. As shown in FIG. 14, a substrate is obtained at step 1402. This could include, for example, obtaining a copper plate, a beryllium or molybdenum substrate with copper plating, or any other suitable substrate 102, 202.

Optionally, a sacrificial material can be placed over the substrate and metal can be deposited over the sacrificial material at step 1404. This could include, for example, forming or otherwise placing the sacrificial material 203 onto the substrate 202 and depositing metal 208a over the sacrificial material 203. The additional metal 208a could be deposited in any suitable manner, such as by using an electro-deposition technique, a metal vapor deposition technique, a sputtering technique, or a chemical vapor deposition technique.

An optical fiber is placed over the substrate at step 1406. This could include, for example, using the fixture 316 or other structure to hold the optical fiber 104, 204 over the substrate 102, 202. This could also include using an elastomeric or other support structure 106, 206 to spread the force on the optical fiber 104, 204.

Metal is deposited around at least part of the optical fiber at step 1408. This could include, for example, performing a deposition process to deposit copper or other metal(s) 108, 208b around at least part of the optical fiber 104, 204. This helps to physically connect the optical fiber 104, 204 to the underlying substrate 102, 202 or metal 208a. Any suitable deposition technique could be used, such as an electro-deposition technique, a metal vapor deposition technique, a sputtering technique, or a chemical vapor deposition technique.

The deposition process could be controlled so that the metal is deposited at a constant speed or at varying speeds. For instance, the deposition process could initially deposit metal more slowly along a lower portion of the optical fiber 104, 204. Once adequate coverage of the lower portion of the optical fiber 104, 204 is achieved to secure the optical fiber to the underlying substrate 102, 202 or metal 208a, the deposition process could deposit metal more quickly to complete the deposition process. Also, during an electro-deposition process, current through the electro-forming solution 304 could be kept low enough during the entire process to avoid significant formation of voids within the deposited metal.

Optionally, the sacrificial material is removed from the metal at step 1410. This could include, for example, removing the sacrificial material 203 by drilling or any other suitable process. This forms at least one cooling channel 210 in the metal through which a cooling fluid can flow.

If desired, the deposited metal is thermally coupled to one or more heat transfer units at step 1412. This could include, for example, mounting the encapsulated optical fiber 104, 204 to one or more heat pipes, metal spreaders, heat sinks, thermoelectric coolers, or blowers. At this point, the fabricated structure can be used to transport any suitable signals.

Although FIG. 14 illustrates one example of a method 1400 for providing thermal management for an optical fiber, various changes may be made to FIG. 14. For example, while shown as a series of steps, various steps in FIG. 14 could overlap, occur in parallel, occur in a different order, or occur multiple times.

It should be noted that different techniques for depositing metal at least partially around an optical fiber could have different benefits depending on how those techniques are implemented. For example, electro-deposition techniques can be equally applicable to shorter and longer fiber interconnects, thereby addressing both high power and low-to-moderate power amplification options. Also, electro-deposition techniques can be used with a number of solid-state laser designs, including chip type, sandwich type, and planar type designs. Further, electro-deposition techniques can be used to form substantially void-free structures, and the substrate and deposited metal can be thick and have a thermal mass that can exceed the thermal mass of the optical fiber by a significant amount (such as by at least three orders of magnitude). Beyond that, electro-deposited metal can reduce or minimize interfacial thermal resistance between a fiber's insulating glass and the metal, as well as provide improved or optimized heat spreading and heat sinking capabilities. Moreover, electro-deposition can achieve low residual stress formation in assemblies with dissimilar materials (such as glass-copper combinations).

In addition, electro-deposition can be used to form well-defined shapes that can support heat transport, not just random structures. For example, a well-engineered metal heat sink can provide thermal spread modes mainly focused towards its base, which may have the dominated thermal mass and can have a desired cross-section that provides a desired thermal spreading. A fiber-based laser cavity can then have predictable lasing with reduced or minimum parasitic oscillations. The spiral pattern shown in FIGS. 4A and 4B is a good example of this, where the underlying substrate (the base) is characterized by a large thermal mass compared to the thermal mass of the optical fiber itself. When properly integrated with the optical fiber positioned in a spiral arrangement, the thermal gradients between fiber loops can be negligibly small, and the thermal field within the fiber loops may be nearly uniform.

While electro-deposition techniques do have many benefits, this disclosure is not limited to just electro-deposition techniques. Other deposition techniques could also be used to at least partially encase an optical fiber, such as metal vapor deposition, sputtering, or chemical vapor deposition. Each of these deposition techniques could have their own strengths.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining a substrate comprising at least one exposed substantially planar metal surface;
   electro-depositing metal onto the at least one exposed substantially planar metal surface of the substrate and around at least a portion of an optical fiber to secure the optical fiber to the substrate and encase at least the portion of the optical fiber, the optical fiber comprising a cladding surrounding a core along a length of the optical fiber except at an end portion of the optical fiber, the electro-deposited metal filling multiple areas between the optical fiber and the substantially planar metal surface, the electro-deposited metal comprising an end portion that encases the end portion of the optical fiber that is not surrounded by the cladding, the optical fiber having multiple points of contact with the substantially planar metal surface, the optical fiber forming at least one coil on the substantially planar metal surface, the at least one coil comprising at least one full loop in contact with the substantially planar metal surface; and providing an optical film over a surface formed by the end portion of the optical fiber and the end portion of the electro-deposited metal;
wherein the substrate and the electro-deposited metal are configured to remove heat from the optical fiber.

2. The method of claim 1, further comprising:
electro-depositing metal around a sacrificial material; and
removing the sacrificial material to form at least one cooling channel through the electro-deposited metal, the at least one cooling channel configured to carry a cooling fluid.

3. The method of claim 1, wherein:
the cladding initially surrounds the core along the length of the optical fiber including at the end portion of the optical fiber; and
the method further comprises removing a portion of the cladding at the end portion of the optical fiber.

4. The method of claim 1, wherein the substrate and the electro-deposited metal collectively have a thermal mass that exceeds a thermal mass of the optical fiber by at least about three orders of magnitude.

5. The method of claim 1, further comprising:
faceting the substrate and the electro-deposited metal at an input of the optical fiber and at an output of the optical fiber.

6. The method of claim 1, wherein electro-depositing the metal comprises electro-depositing the metal at room temperature.

7. The method of claim 1, further comprising:
forming a port so that a portion of the optical fiber remains exposed through the electro-deposited metal.

8. The method of claim 1, wherein the optical fiber follows an in-plane coiled path in one direction before reversing a direction of travel and then following an in-plane coiled path in another direction.

9. The method of claim 1, wherein electro-depositing the metal comprises fully encasing the optical fiber in the electro-deposited metal.

10. An apparatus comprising:
a substrate having a substantially planar surface;
an optical fiber having multiple points of contact with the substantially planar surface of the substrate, the optical fiber forming at least one coil on the substantially planar surface, the at least one coil comprising at least one full loop in contact with the substantially planar surface, the optical fiber comprising a cladding surrounding a core along a length of the optical fiber except at an end portion of the optical fiber;
electro-deposited metal in contact with the substantially planar surface and encasing at least a portion of the optical fiber, the electro-deposited metal filling multiple areas between the optical fiber and the substantially planar surface, the electro-deposited metal comprising an end portion that encases the end portion of the optical fiber that is not surrounded by the cladding; and
an optical film disposed over a surface formed by the end portion of the optical fiber and the end portion of the electro-deposited metal;
wherein the substrate and the electro-deposited metal are configured to remove heat from the optical fiber.

11. The apparatus of claim 10, wherein:
the optical fiber comprises multiple segments joined at a splice or fused fiber coupler; and
the substrate and the electro-deposited metal surround the splice or fused fiber coupler.

12. The apparatus of claim 10, wherein:
the substrate comprises a second core and a metal deposited on the second core; and
the electro-deposited metal is located on the metal of the substrate.

13. The apparatus of claim 10, further comprising:
a material surrounding at least part of the optical fiber, the electro-deposited metal located around at least a portion of the material;
wherein the material comprises a second metal that is softer than the electro-deposited metal.

14. The apparatus of claim 10, wherein the surface formed by the end portion of the optical fiber and the end portion of the electro-deposited metal is at an angle relative to the optical fiber, the angle selected such that reflected signal light is able to penetrate into the cladding.

15. The apparatus of claim 10, further comprising:
at least one cooling channel through the electro-deposited metal, the at least one cooling channel configured to carry a cooling fluid.

16. The apparatus of claim 10, further comprising:
a port through the electro-deposited metal, the port exposing a portion of the optical fiber to an exterior environment.

17. The apparatus of claim 10, wherein the substrate and the electro-deposited metal collectively have a thermal mass that exceeds a thermal mass of the optical fiber by at least about three orders of magnitude.

18. The apparatus of claim 10, wherein:
a first one of the multiple filled areas between the optical fiber and the substrate is on a first side of a first one of the multiple points of contact; and
a second one of the multiple filled areas between the optical fiber and the substrate is on a second side of the first point of contact.

19. A system comprising:
a laser configured to generate optical signals; and
an apparatus configured to transport the optical signals, the apparatus comprising:
a substrate having a substantially planar surface;
an optical fiber configured to transport the optical signals, the optical fiber having multiple points of contact with the substantially planar surface of the substrate, the optical fiber forming at least one coil on the substantially planar surface, the at least one coil comprising at least one full loop in contact with the substantially planar surface, the optical fiber comprising a cladding surrounding a core along a length of the optical fiber except at an end portion of the optical fiber;
electro-deposited metal in contact with the substantially planar surface and encasing at least a portion of the optical fiber, the electro-deposited metal filling multiple areas between the optical fiber and the substantially planar surface, the electro-deposited metal comprising an end portion that encases the end portion of the optical fiber that is not surrounded by the cladding; and
an optical film disposed over a surface formed by the end portion of the optical fiber and the end portion of the electro-deposited metal;
wherein the substrate and the electro-deposited metal are configured to remove heat from the optical fiber.

20. The system of claim 19, further comprising:
a heat transfer unit thermally coupled to the substrate and the electro-deposited metal, the heat transfer unit configured to remove heat from the apparatus.

21. The system of claim 19, further comprising:
at least one cooling loop configured to transport a cooling fluid through at least one cooling channel in the apparatus in order to remove heat from the apparatus.

22. A method comprising:
obtaining a substrate comprising at least one exposed substantially planar metal surface;
depositing metal onto the at least one exposed substantially planar metal surface of the substrate and around at least a portion of an optical fiber to secure the optical fiber to the substrate and encase at least the portion of the optical fiber, the optical fiber comprising a cladding surrounding a core along a length of the optical fiber except at an end portion of the optical fiber, the deposited metal filling multiple areas between the optical fiber and the substantially planar metal surface, the deposited metal comprising an end portion that encases the end portion of the optical fiber that is not surrounded by the cladding, the optical fiber having multiple points of contact with the substantially planar metal surface, the optical fiber forming at least one coil on the substantially planar metal surface, the at least one coil comprising at least one full loop in contact with the substantially planar metal surface; and
providing an optical film over a surface formed by the end portion of the optical fiber and the end portion of the deposited metal;
wherein the substrate and the deposited metal are configured to remove heat from the optical fiber.

23. The method of claim 22, wherein depositing the metal comprises depositing the metal using at least one of: an electro-deposition technique, a metal vapor deposition technique, a sputtering technique, and a chemical vapor deposition technique.

24. The method of claim 22, further comprising:
depositing metal around a sacrificial material; and
removing the sacrificial material to form at least one cooling channel through the deposited metal, the at least one cooling channel configured to carry a cooling fluid.

25. The method of claim 22, wherein:
the cladding initially surrounds the core along the length of the optical fiber including at the end portion of the optical fiber; and
the method further comprises removing a portion of the cladding at the end portion of the optical fiber.

26. The method of claim 22, wherein depositing the metal comprises depositing the metal at room temperature.

27. The method of claim 22, further comprising:
forming a port so that a portion of the optical fiber remains exposed through the deposited metal.

28. The method of claim 22, wherein the optical fiber follows an in-plane coiled path in one direction before reversing a direction of travel and then following an in-plane coiled path in another direction.

* * * * *